United States Patent
Choi et al.

(10) Patent No.: US 11,870,091 B2
(45) Date of Patent: Jan. 9, 2024

(54) BATTERY PACK AND ENERGY STORAGE SYSTEM INCLUDING THE SAME

(71) Applicant: LG CHEM, LTD., Seoul (KR)

(72) Inventors: Yeo-Joo Choi, Daejeon (KR); Bum-Hyun Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 459 days.

(21) Appl. No.: 17/255,940

(22) PCT Filed: May 14, 2020

(86) PCT No.: PCT/KR2020/006367
§ 371 (c)(1),
(2) Date: Dec. 23, 2020

(87) PCT Pub. No.: WO2020/231206
PCT Pub. Date: Nov. 19, 2020

(65) Prior Publication Data
US 2021/0249728 A1    Aug. 12, 2021

(30) Foreign Application Priority Data

May 15, 2019  (KR) .................. 10-2019-0057160
May 11, 2020  (KR) .................. 10-2020-0056179

(51) Int. Cl.
*H01M 50/284*  (2021.01)
*H01M 50/271*  (2021.01)
*H01M 10/42*   (2006.01)

(52) U.S. Cl.
CPC ....... *H01M 50/284* (2021.01); *H01M 10/425* (2013.01); *H01M 50/271* (2021.01); *H01M 2010/4271* (2013.01); *H01M 2220/10* (2013.01); *H01M 2220/20* (2013.01)

(58) Field of Classification Search
None
See application file for complete search history.

(56) References Cited

U.S. PATENT DOCUMENTS

| 2011/0206970 A1 | 8/2011 | Itoi et al. |
| 2015/0132630 A1 | 5/2015 | Kim et al. |
| 2015/0295283 A1* | 10/2015 | Eom .................. H01M 10/425 |
| | | 429/61 |

(Continued)

FOREIGN PATENT DOCUMENTS

| CN | 103427062 A | 12/2013 |
| EP | 2760063 A1 | 7/2014 |

(Continued)

OTHER PUBLICATIONS

Extended European Search Report for European Application No. 20806351.1, dated Jan. 31, 2022.

(Continued)

*Primary Examiner* — Wyatt P McConnell
(74) *Attorney, Agent, or Firm* — Birch, Stewart, Kolasch & Birch, LLP

(57) ABSTRACT

A battery pack includes a plurality of battery modules, each having at least one battery cell; and a pack cover having a battery management system (BMS) for managing the plurality of battery modules and configured to integrally cover the plurality of battery modules.

10 Claims, 12 Drawing Sheets

(56) References Cited

U.S. PATENT DOCUMENTS

| | | |
|---|---|---|
| 2017/0117519 A1 | 4/2017 | Schoenherr et al. |
| 2017/0187084 A1 | 6/2017 | Park et al. |
| 2017/0194674 A1 | 7/2017 | Lee et al. |
| 2017/0256760 A1 | 9/2017 | Nietling et al. |
| 2017/0365887 A1 | 12/2017 | Kwon et al. |
| 2019/0006646 A1 | 1/2019 | Lee et al. |
| 2019/0036091 A1 | 1/2019 | Lee et al. |
| 2019/0173064 A1 | 6/2019 | Lee et al. |

FOREIGN PATENT DOCUMENTS

| | | |
|---|---|---|
| EP | 2955772 A1 | 12/2015 |
| EP | 3016177 A1 | 5/2016 |
| EP | 3 664 186 A1 | 6/2020 |
| JP | 2018-536258 A | 12/2018 |
| JP | 2019-511809 A | 4/2019 |
| KR | 10-2011-0069122 A | 6/2011 |
| KR | 10-2013-0133434 A | 12/2013 |
| KR | 10-2014-0010234 A | 1/2014 |
| KR | 10-1441900 B1 | 9/2014 |
| KR | 10-2016-0050492 A | 5/2016 |
| KR | 10-2016-0077758 A | 7/2016 |
| KR | 10-2017-0003791 A | 1/2017 |
| KR | 10-2017-0084699 A | 7/2017 |
| KR | 10-2017-0142442 A | 12/2017 |
| KR | 10-2018-0044099 A | 5/2018 |
| KR | 10-2018-0050086 A | 5/2018 |
| KR | 10-2018-0107468 A | 10/2018 |
| KR | 10-2019-0074759 A | 6/2019 |

OTHER PUBLICATIONS

International Search Report for PCT/KR2020/006367 (PCT/ISA/210) dated Aug. 13, 2020.

* cited by examiner

BATTERY PACK AND ENERGY STORAGE SYSTEM INCLUDING THE SAME

TECHNICAL FIELD

The present disclosure relates to a battery pack and an energy storage system including the battery rack.

The present application claims priority to Korean Patent Application No. 10-2019-0057160 filed on May 15, 2019 and Korean Patent Application No. 10-2020-0056179 filed on May 11, 2020 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack or battery rack by using at least one battery module and adding other components. Here, according to various voltage and capacity requirements, an energy storage system may be configured to include at least one battery pack or battery rack that includes at least one battery module.

When a conventional battery pack provided for home use is installed, generally, two or three workers install the battery pack having a weight of about 80 kg to 100 kg at the site. In the case of the conventional battery pack, when if after-sales service is required for maintenance or repair after the installation, it may be necessary to replace a battery module in the battery pack.

Recently, as the battery pack has a greater capacity, the weight of the battery pack increases, which increases the risk to workers during installation and causes difficulties during transportation.

In addition, if it is required to replace some battery modules in the conventional battery pack, the entire battery pack must be replaced, rather than some battery modules that need to be replaced.

DISCLOSURE

Technical Problem

Therefore, the present disclosure is directed to providing a battery pack, which is easy to install and carry, and an energy storage system including the battery pack.

Moreover, the present disclosure is also directed to providing a battery pack, which may be easily replaced or easily maintained in the future, and an energy storage system including the battery pack.

Technical Solution

In one aspect of the present disclosure, there is provided a battery pack, comprising: a plurality of battery modules, each battery module of the plurality of battery modules having at least one battery cell; and a pack cover having a battery management system (BMS) for managing the plurality of battery modules and configured to integrally cover the plurality of battery modules.

The pack cover may be configured to cover an upper side of each of the plurality of battery modules and is detachably connected to the upper side of each of the plurality of battery modules.

Each of the plurality of battery modules may further include and a module case configured to accommodate the at least one battery cell, and the module case may be detachably coupled to the pack cover.

The pack cover may have at least one module connection portion connected to the module case.

The module case may have at least one cover connection portion connected to the at least one module connection portion.

The at least one module connection portion and the at least one cover connection portion may be detachable from each other by user manipulation.

The at least one module connection portion may be provided to a bottom of the pack cover, and the at least one cover connection portion may be provided to an upper side of the module case.

The battery pack may further comprise a support unit configured to fix the plurality of battery modules at a lower side of each of the plurality of battery modules.

The BMS may be operated to manage the plurality of battery modules entirely or to manage at least one battery module among the plurality of battery modules individually.

In another aspect of the present disclosure, there is also provided an energy storage system, which comprises at least one battery pack according to the above embodiments.

Advantageous Effects

According to various embodiments as above, it is possible to provide a battery pack, which is easy to install and carry, and an energy storage system including the battery pack.

Moreover, according to various embodiments as above, it is possible to provide a battery pack, which may allow battery modules to be easily replaced or maintained in the future, and an energy storage system including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
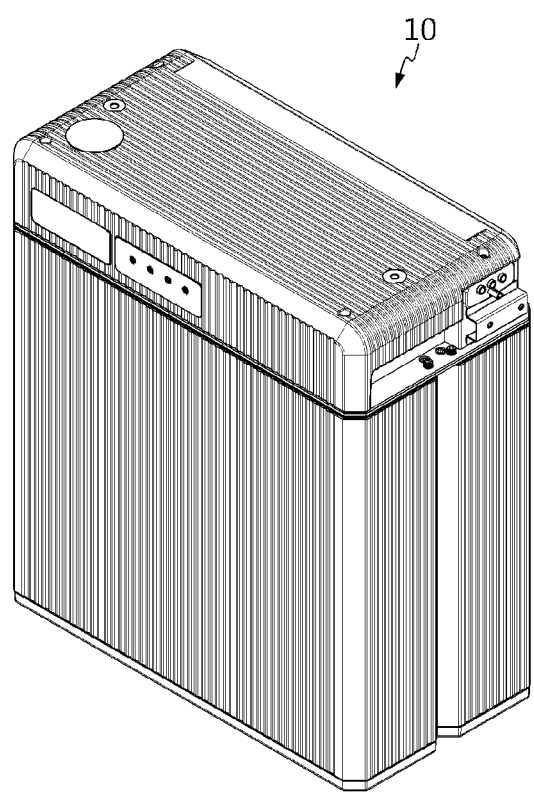
FIG. 1 is a diagram for illustrating a battery pack according to an embodiment of the present disclosure.
Figure 2:
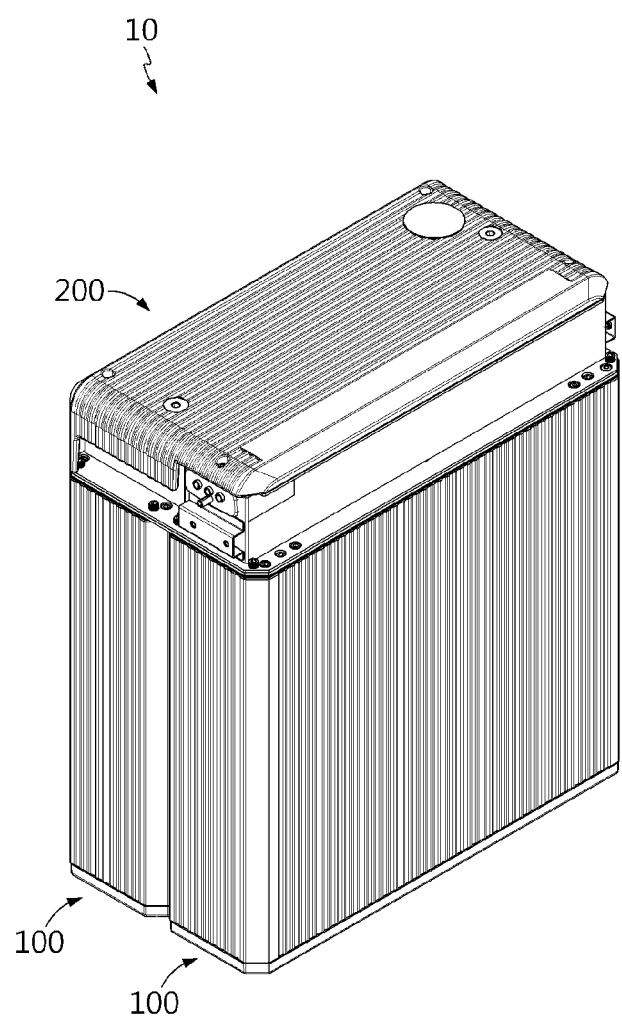
FIG. 2 is a rear perspective view showing the battery pack of FIG. 1.
Figure 3:
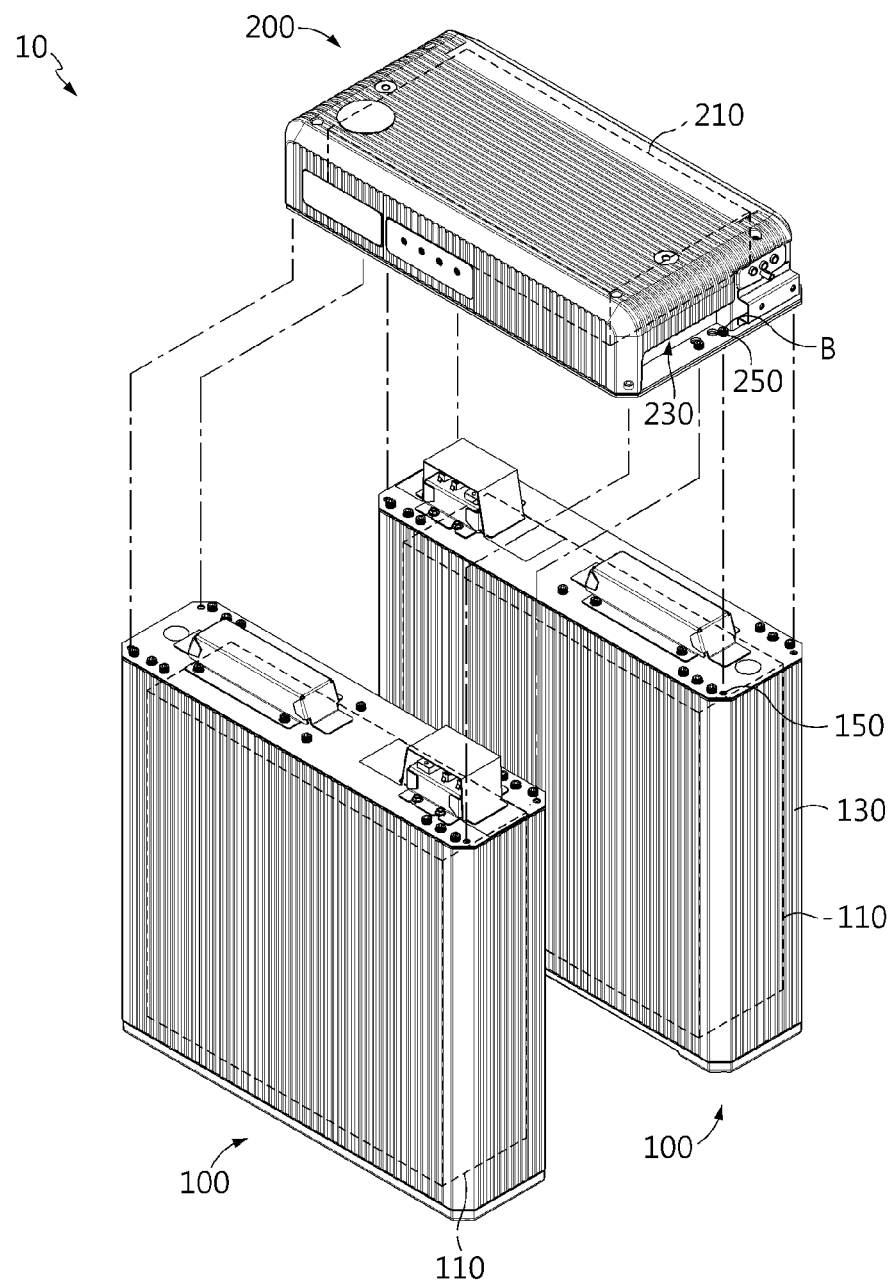
FIG. 3 is an exploded perspective view showing the battery pack of FIG. 1.
Figure 4:
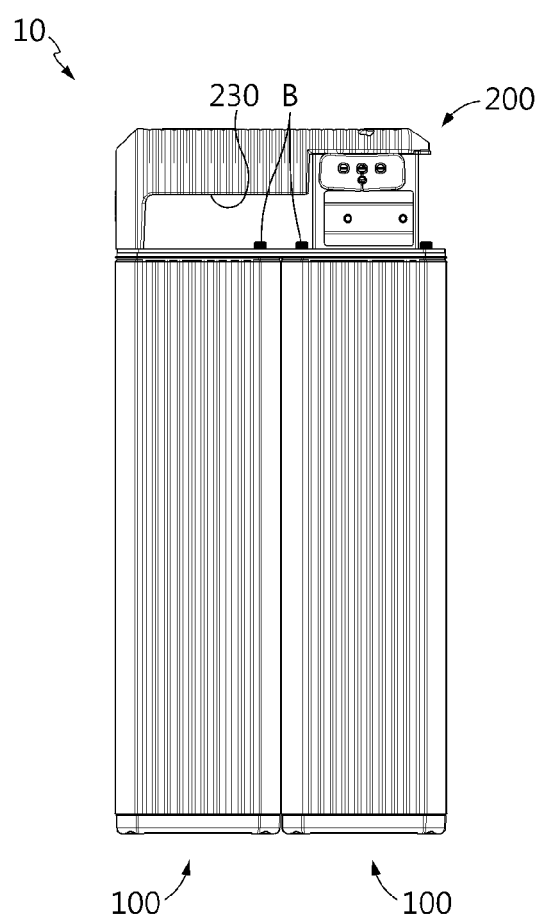
FIG. 4 is a side view showing the battery pack of FIG. 1.

FIG. 1 is a diagram for illustrating a battery pack according to an embodiment of the present disclosure, FIG. 2 is a rear perspective view showing the battery pack of FIG. 1, FIG. 3 is an exploded perspective view showing the battery pack of FIG. 1, and FIG. 4 is a side view showing the battery pack of FIG. 1.

Referring to FIGS. 1 to 4, a battery pack 10 may be provided to an energy storage system, a vehicle or the like as an energy source. Here, the energy storage system may be provided for home or industrial use.

Hereinafter, in this embodiment, the battery pack 10 will be described as being provided as an energy storage system for home use. If the battery pack 10 is provided as an energy storage system for home use, the battery pack 10 may be provided in the number of one or more, and be configured to be directly or indirectly connected with other components of the energy storage system. The battery pack 10 may be installed inside or outside a building or the like to be located near a structure such as a wall W (see FIG. 10).

The battery pack 10 may include a plurality of battery modules 100 and a pack cover 200.

The plurality of battery modules 100 may be integrally connected to the pack cover 200, explained later. Each of the plurality of battery modules 100 may include a battery cell 110, a module case 130, and a cover connection portion 150.

The battery cell 110 is a secondary battery and may be provided as a pouch-type secondary battery, a rectangular secondary battery, or a cylindrical secondary battery. Hereinafter, in this embodiment, it will be described that the battery cell 110 is a secondary battery, particularly a pouch-type secondary battery.

The battery cell 110 may be provided in the number of one or more. Hereinafter, in this embodiment, it will be described that the battery cell 110 is provided in plural such that the plurality of battery cells are electrically connected to each other to configure a battery cell assembly.

The module case 130 may accommodate the at least one battery cell 110 or the plurality of battery cells 110. To this end, an accommodation space capable of accommodating the at least one battery cell 110 or the plurality of battery cells 110 may be provided in the module case 130.

The module case 130 may be detachably connected to the pack cover 200, explained later, through a cover connection portion 150, explained later. This detachable connection structure will be described later in more detail in the related description.

The cover connection portion 150 is provided to the module case 130 and may be connected to at least one module connection portion 250, explained later. Specifically, the cover connection portion 150 may be provided to an upper side of the module case 130, and may be provided in plural.

The plurality of cover connection portions 150 may be provided at four corners of an upper surface of the module case 130. Each of the plurality of cover connection portions 150 may be provided in a groove shape having a predetermined depth, and may have a thread for coupling with a bolt member B, explained later.

The pack cover 200 includes a BMS 210 for managing the plurality of battery modules 100, and may integrally cover the plurality of battery modules 100.

Specifically, the pack cover 200 may cover an upper side of the plurality of battery modules 100 and may be detachably connected to the upper side of the plurality of battery modules 100.

The pack cover 200 may include the BMS 210, a handle 230, and a module connection portion 250.

The BMS 210 is a battery management system, and may integrally manage the plurality of battery modules 100. The BMS 210 is included in the pack cover 200 and may be electrically connected to the plurality of battery modules 100.

The BMS 210 may be operated to manage the plurality of battery modules 100 entirely or to manage at least one battery module 100 among the plurality of battery modules 100 individually.

Specifically, the BMS 210 may control the operation of the battery module 100 coupled to the pack cover 200 even when some of the battery modules 100 of the battery pack 10 are separated or deviated from the pack cover 200.

Accordingly, in the present disclosure, when an abnormality occurs in at least one battery module 100 among the battery modules 100, the remaining battery connected to the pack cover 200 even after separating the abnormal battery module 100 from the pack cover 200 Module 100 can be operated through the BMS 210. As described above, in this embodiment, since electricity can be continuously supplied even in such a situation, it is possible to provide urgent electricity necessary for real life such as a home.

Accordingly, in the present disclosure, when an abnormality occurs in at least one battery module 100 among the battery modules 100, the remaining battery modules connected to the pack cover 200 may be operated by means of the BMS 210 even after the abnormal battery module 100 is separated from the pack cover 200 100. As above, in this embodiment, since electricity may be continuously supplied even in such a situation, it is possible to provide urgent electricity required for real life at home.

The handle 230 may be formed at left and right sides and a rear side of the pack cover 230. The handle 230 may be integrally formed to have a predetermined space at the left, right and rear sides of the pack cover 230.

By means of the handle 230, a user or installer may carry the pack cover 200 more easily. In addition, as the handle 230 is integrally formed at the left, right and right sides of the pack cover 230, the handle 230 is not exposed at the front of the battery pack 10, thereby improving the aesthetics of the battery pack 10.

Moreover, in this embodiment, since a separate tool for installing the handle 230 is not required, the assembling efficiency is improved, and manufacturing cost is lowered, thereby securing cost competitiveness.

The module connection portion 250 is formed at a bottom of the pack cover 200 and may be connected to the module case 130 of the plurality of battery modules 100. Specifically, the module connection portion 250 may be connected to a cover connection portion 150 formed at the module case 130.

The module connection portion 250 may be provided in the number of one or more. Hereinafter, in this embodiment, it will be described that the module connection portion 250 is provided in plural.

The plurality of module connection portions 250 may be provided in a groove shape having a predetermined size, and may be provided at the bottom of the pack cover 200. Specifically, the plurality of module connection portions 250 may be provided at four corners of the bottom of the pack cover 200 at locations corresponding to the plurality of cover connection portions 150.

The plurality of module connection portions 250 may be detachably connected to the plurality of cover connection portions 150 by means of a bolt member B, respectively. Specifically, the plurality of module connection portions 250 and the plurality of cover connection portions 150 may be configured to be separated from each other according to a user manipulation by a user or installer. The user manipulation may be a mounting manipulation by connecting the bolt member B and a detaching manipulation by releasing the connection of the bolt member B.

Figure 5:
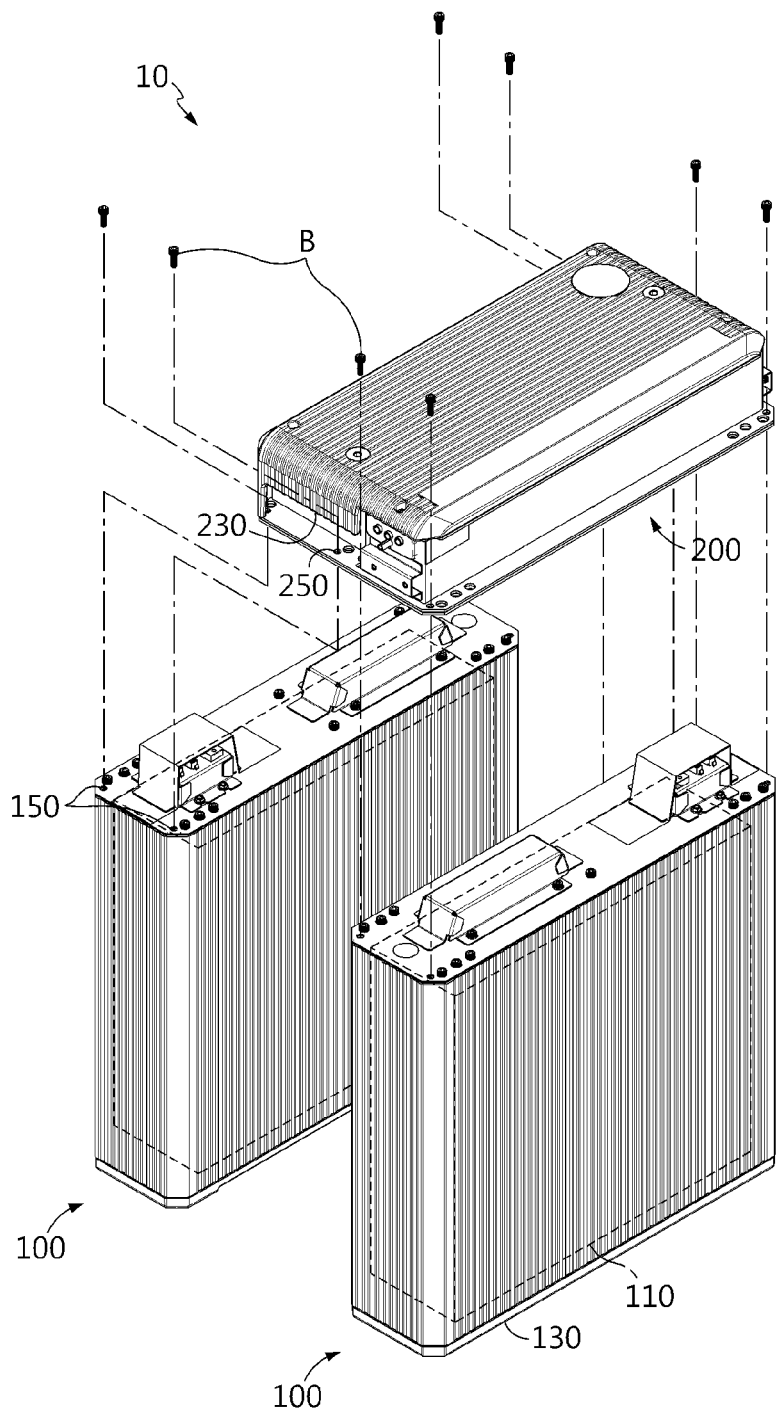
FIG. 5 is a diagram for illustrating a connection between battery modules and a pack cover in the battery pack of FIG. 1.

FIG. 5 is a diagram for illustrating a connection between battery modules and a pack cover in the battery pack of FIG. 1.

Referring to FIG. 5, the user or the like may couple the plurality of battery modules 100 and the pack cover 200 to each other according to user manipulation using the plurality of bolt members B.

Specifically, the user or the like may pass the bolt members B through the module connection portions 250 of the pack cover 200 and then fastening the bolt members B to the cover connection portions 150 of the plurality of battery modules 100, so that the plurality of battery modules 100 and the pack cover 200 are coupled with each other.

In addition, if necessary, the user or the like may separate the plurality of battery modules 100 and the pack cover 200 from each other by manipulating the bolt members B.

Specifically, the user or the like may release the bolt members B coupled to the battery module 100, which is to be separated, from the cover connection portions 150 and the module connection portions 250 according to user manipulation, and separate the battery module 100, from which the bolt members B are released, from the pack cover 200. Here, the user or the like may selectively separate all or a part of the battery modules 100 from the pack cover 200.

Figure 6:
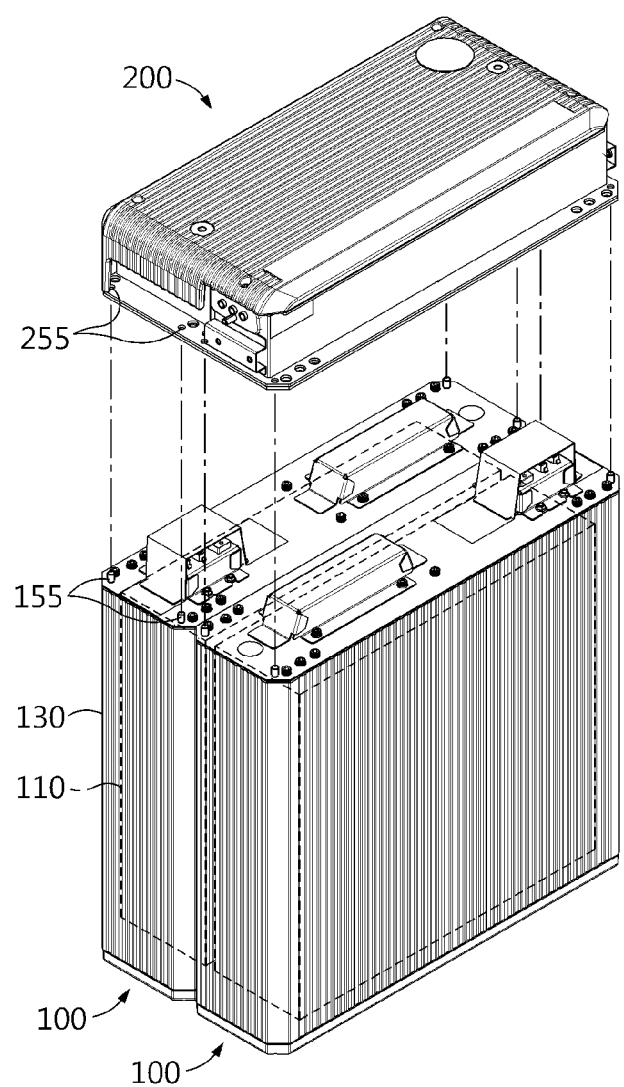
FIG. 6 is a diagram for illustrating a connection between the battery modules and the pack cover according to another embodiment of the battery pack of FIG. 1.

FIG. 6 is a diagram for illustrating a connection between the battery modules and the pack cover according to another embodiment of the battery pack of FIG. 1.

Referring to FIG. 6, the cover connection portions 155 of the plurality of battery modules 100 are provided in a protrusion shape protruding to a predetermined height, and may be provided to the module case 130 so as to be slidable in a vertical direction.

The cover connection portions 155 may be mounted to the module connection portions 255 of the pack cover 200, and may protrude above the module connection portions 255 or move below the module connection portions 250 by vertically sliding motion according to user manipulation.

Here, the cover connection portions 155 may be elastically mounted in the module case 130 for the vertical sliding. To this end, the cover connection portions 155 may be provided with an elastic member for guiding an elastic operation for the sliding and a stopper for limiting movement of the cover connection portions 155 after the sliding.

If the cover connection portions 155 protrude above the module connection portions 255, or specifically, if the cover connection portions 155 protrude above the module connection portions 255 while penetrating the module connection portions 255, the battery modules 100 may be disposed in a state of being coupled with the pack cover 200.

If the user wants to separate the battery module 100 from the pack cover 200, the user presses the protruding cover connection portions 155 of the battery module 100 to be separated so that the protruding cover connection portions 155 may slide downward and move toward the module connection portions 255.

If the cover connection portions 155 move below the module connection portions 255 according to the downward sliding of the cover connection portions 155 according to the pressing of the user, the coupled state of the battery module 100 to be separated from the pack cover 200 may be released. After that, the user may more conveniently detach the battery module 100 to be separated from the pack cover 200.

As above, the cover connection portions 155 of the plurality of battery modules 100 and the module connection portions 255 of the pack cover 200 may be detachably connected without separate bolt members B.

In this embodiment, unlike the former embodiment, the cover connection portions 155 of the plurality of battery modules 100 and the module connection portions 255 of the pack cover 200 may be detachably connected to each other without separate bolt members B, thereby further reducing manufacturing cost and further increasing the user manipulation.

Hereinafter, the installation process of the battery pack 10 according to this embodiment will be described in more detail.

FIGS. 7 to 10 are diagrams for illustrating the battery pack of FIG. 1 when being installed.

Figure 7:
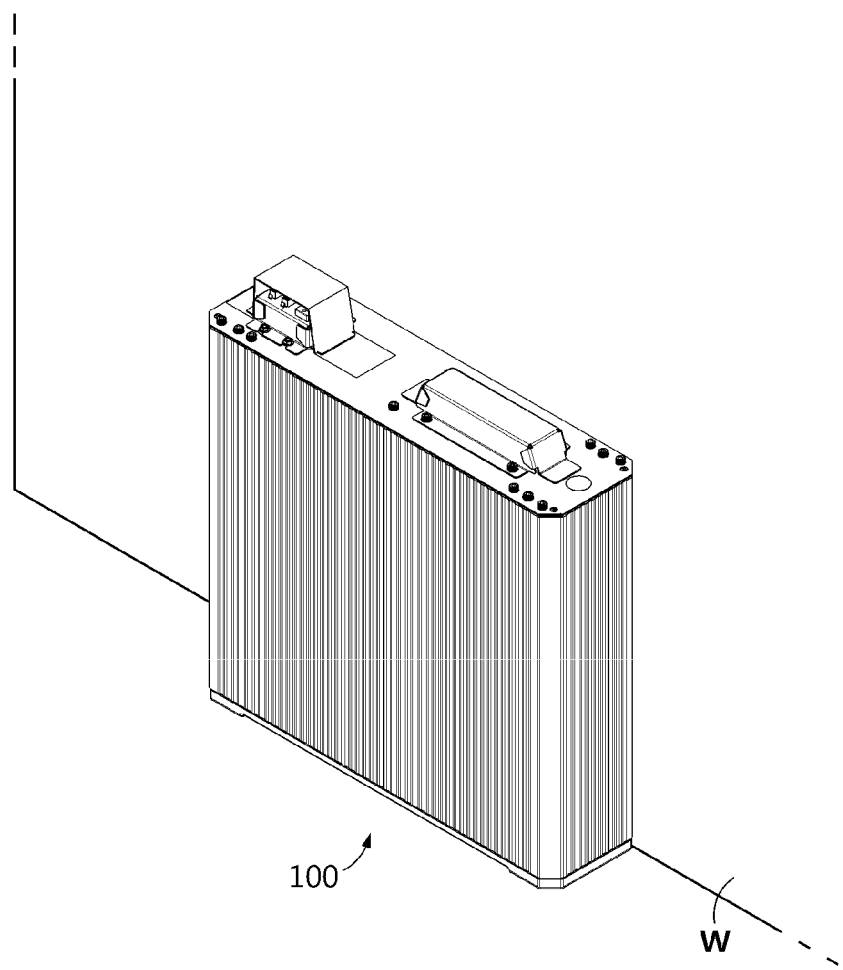
FIGS. 7 to 10 are diagrams for illustrating the battery pack of FIG. 1 when being installed.

Referring to FIG. 7, when installing the battery pack 10 (see FIG. 1), a user such as an installer or a carrier may firstly place any one battery module 100 at an installation place where the battery module 100 is to be installed. At this time, the user or the like may place the battery module 100 near the wall W of the installation place so that the battery pack 10 is mounted more stably.

Figure 8:
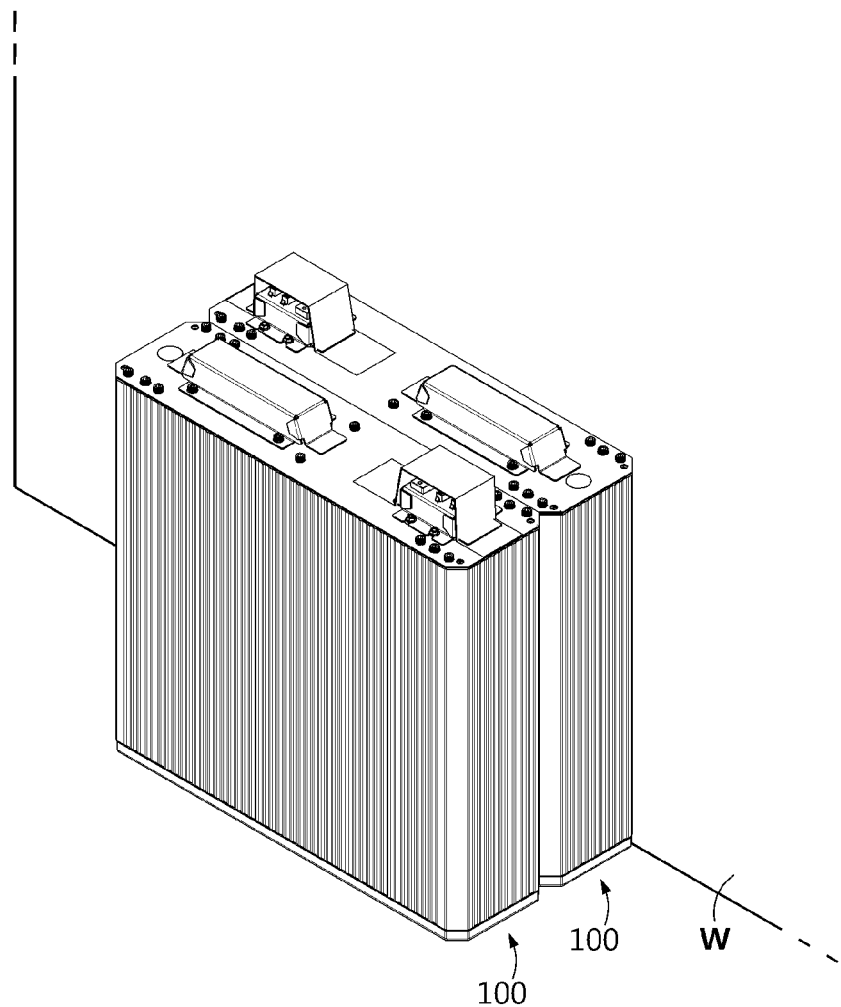

Referring to FIG. 8, after that, the user or the like may place another battery module 100 at the front of the battery module 100 placed near the wall W. In this way, in this embodiment, when the battery pack 10 (see FIG. 1) is installed, a plurality of battery modules 100 may be individually carried and placed in the installation place. Accordingly, in this embodiment, it is possible to reduce the weight when carrying the battery modules 100, thereby carrying the battery modules 100 more efficiently.

Figure 9:
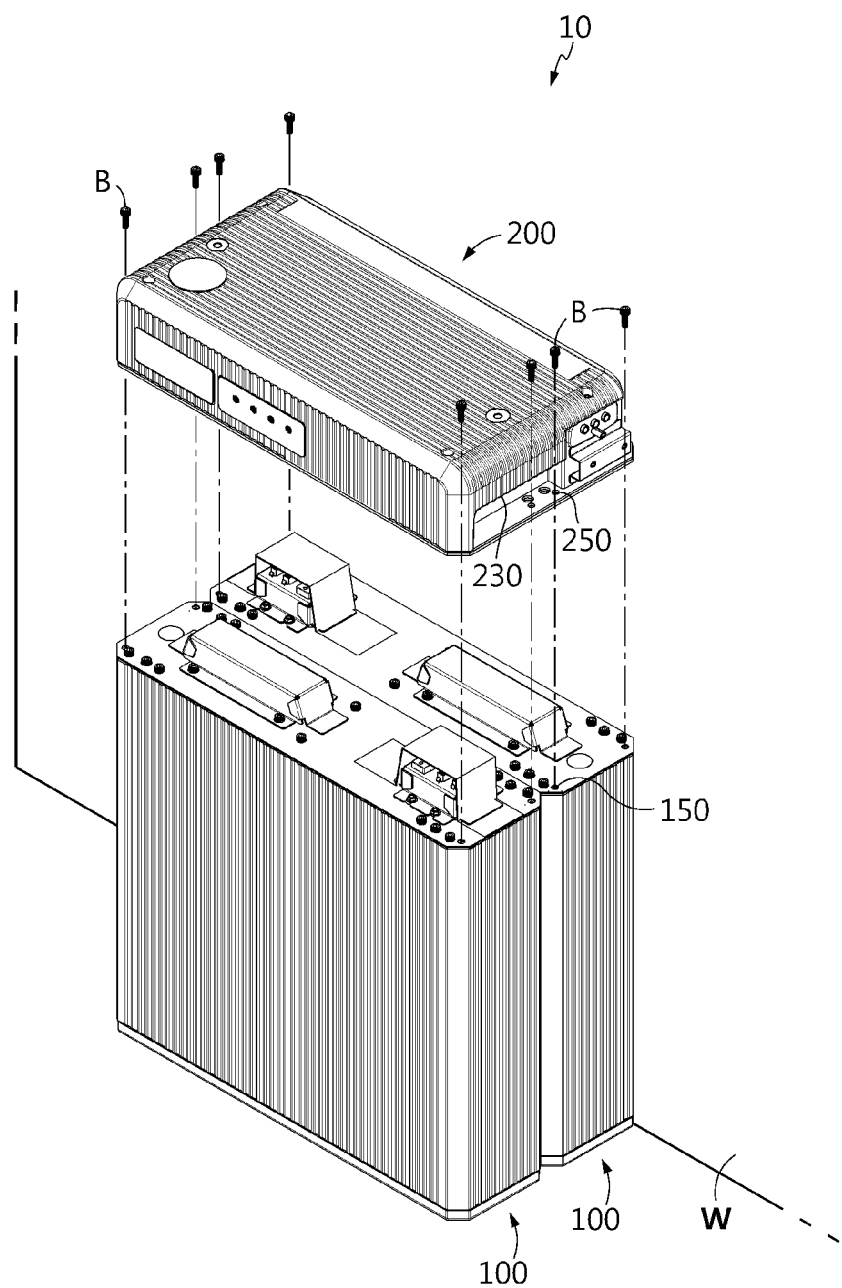

Referring to FIG. 9, after that, the user or the like may mount the pack cover 200 at an upper side of the battery modules 100. Here, the user or the like may more easily carry the pack cover 200 by using the handle 230.

Specifically, the user or the like may place the pack cover 200 at the upper side of the plurality of battery modules 100. After that, the user or the like may pass the plurality of bolt members B through the module connection portions 250 of the pack cover 200, respectively, and then fasten the plurality of bolt members B to the cover connection portions 150 of the plurality of battery modules 100.

Figure 10:
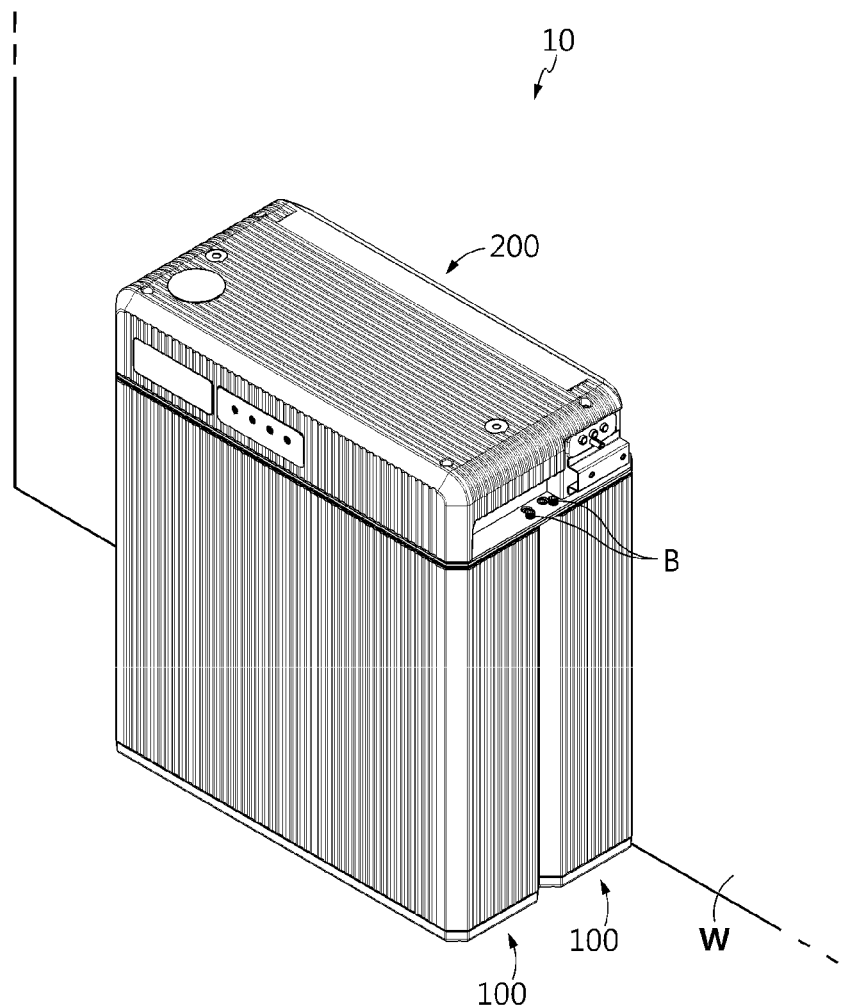

Referring to FIG. 10, by the fastening using the bolt members B, the plurality of battery modules 100 of the battery pack 10 and the pack cover 200 may be coupled to each other.

Meanwhile, the user or the like may separate all or a part of the plurality of battery modules 100 from the pack cover 200 by releasing the connection of the bolt members B.

Accordingly, in this embodiment, when at least some of the battery modules 100 needs to be replaced due to future management of the battery pack 10, it is possible to easily replace only a battery module, which needs to be replaced from the pack cover 200, just by releasing the connection of only the bolt member B connected to the battery module 100, which needs to be replaced.

In other words, in this embodiment, when it is required to replace some battery modules 100 of the battery pack 10 due to abnormality, it is not needed to replace the battery pack 10 entirely, which ensures easy maintenance in the future and provides more advantages in terms of economy.

Figure 11:
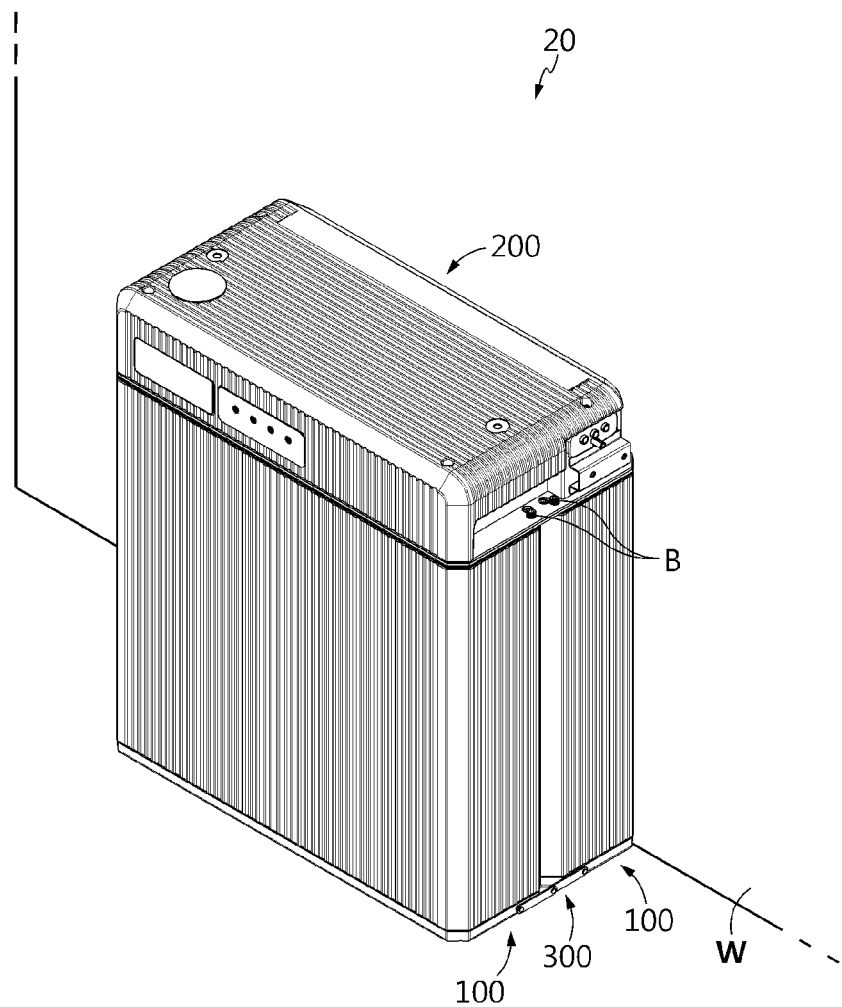
FIG. 11 is a diagram for illustrating a battery pack according to another embodiment of the present disclosure.
Figure 12:
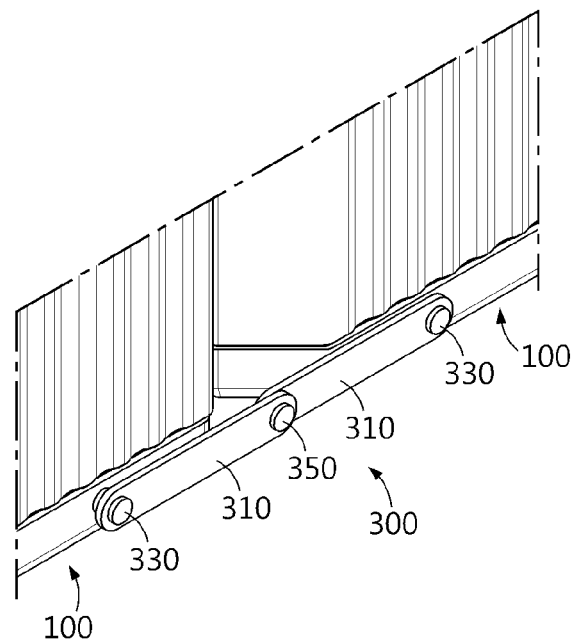
FIG. 12 is an enlarged view showing a main part of FIG. 11.

FIG. 11 is a diagram for illustrating a battery pack according to another embodiment of the present disclosure, and FIG. 12 is an enlarged view showing a main part of FIG. 11.

Since a battery pack 20 according to this embodiment is similar to the battery pack 10 of the former embodiment, features substantially identical or similar to the former embodiment will not be described again, and features different from the former embodiment will be described in detail.

Referring to FIGS. 11 and 12, the battery pack 20 may include a plurality of battery modules 100, a pack cover 200, and a support unit 300.

The plurality of battery modules 100 and the pack cover 200 are substantially identical or similar to the former embodiment and thus will not be described again.

The support unit 300 may fix the plurality of battery modules 100 at a lower side of the plurality of battery modules 100. The support unit 300 at the lower side of the plurality of battery modules 100 may prevent the battery modules 100 from being spaced or displaced.

The support unit 300 may be provided at an end of the lower side of the plurality of battery modules 100, without being limited thereto. The support unit 300 may be provided at an upper end or a middle portion of the plurality of battery modules 100 as long as the support unit 300 may prevent the plurality of battery modules 100 from being spaced or displaced.

Hereinafter, in this embodiment, it will be described that the support unit 300 is provided at the lower end of the plurality of battery modules 100, and more specifically, it will be described that one support unit 300 is provided at the lower end of the plurality of battery modules 100.

The support unit 300 may include a pair of support members 310, a pair of fixing members 330, and a connection member 350.

The pair of support members 310 may be provided in a bar shape having a predetermined length. Each of the pair of support members 310 may be provided at the lower side of the battery module 100.

The pair of fixing members 330 are connected to the pair of support members 310, respectively, and may be fixedly mounted to the battery modules 100. Here, the pair of fixing members 330 may be provided using a member such as a magnet, and may be attached to the lower end of the battery modules 100 or inserted and fixed at the lower end of the battery modules 100.

The connection member 350 may connect the pair of support members 310. The connection member 350 is a hinge pin and may pivot the pair of support members 310 at a predetermined angle. The user or the like may adjust the separation distance between the lower ends of the battery modules 100 facing each other according to the pivoting of the pair of support members 310 by the predetermined angle.

Figure 13:
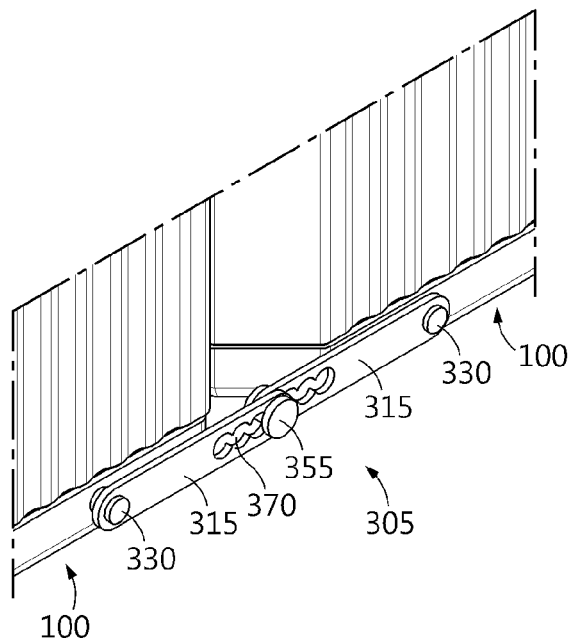
FIG. 13 is a diagram for illustrating a support unit according to another embodiment of the battery pack of FIG. 11.

FIG. 13 is a diagram for illustrating a support unit according to another embodiment of the battery pack of FIG. 11.

Since the support unit 305 according to this embodiment is similar to the support unit 300 of the former embodiment, features substantially identical or similar to the former embodiment will not be described again, and features different from the former embodiment will be described in detail.

Referring to FIG. 13, the support unit 305 may include a pair of support members 315, a pair of fixing members 330, a connection member 355, and a guide slit 370.

Each of the pair of support members 315 may have a guide slit 370, explained later.

Since the pair of fixing member 330 is substantially identical or similar to the former embodiment and thus will not be described again.

The connection member 355 is mounted through the guide slits 370 of the pair of support members 315 and may be provided to be slidable along the guide slits 370.

The guide slit 370 may be provided to each support member 315 and may have a plurality of grooves. The connection member 355 may be mounted to the guide slit 370.

In this embodiment, as the pair of support members 315 rotate, the connection member 355 may be sequentially caught in the grooves of the guide slits 370. Accordingly, in this embodiment, when the pair of support members 315 rotates by a predetermined angle in order to adjust the separation distance between the lower ends of the battery modules 100 facing each other, it is possible to prevent the connection member 355 from drooping due to the gravity.

According to various embodiments as above, it is possible to provide a battery pack 10, which is easy to install and carry, and an energy storage system including the battery pack 10.

Moreover, according to various embodiments as above, it is possible to provide a battery pack 10, which may allow battery modules to be easily replaced or maintained in the future, and an energy storage system including the battery pack 10.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery pack, comprising:
a plurality of battery modules, each battery module of the plurality of battery modules having at least one battery cell;
a pack cover having a battery management system (BMS) for managing the plurality of battery modules and configured to integrally cover the plurality of battery modules, wherein the pack cover is configured to cover an upper side of each of the plurality of battery modules and is detachably connected to the upper side of each of the plurality of battery modules; and
a support unit configured to fix the plurality of battery modules at a lower side of each of the plurality of battery modules, the support unit attached to a side wall of each of the plurality of battery modules.

2. The battery pack according to claim 1, wherein each of the plurality of battery modules further includes:
a module case configured to accommodate the at least one battery cell,
wherein the module case is detachably coupled to the pack cover.

3. The battery pack according to claim 2, wherein the pack cover has at least one module connection portion connected to the module case.

4. The battery pack according to claim 3, wherein the module case has at least one cover connection portion connected to the at least one module connection portion.

5. The battery pack according to claim 4, wherein the at least one module connection portion and the at least one cover connection portion are detachable from each other by user manipulation.

6. The battery pack according to claim 4, wherein the at least one module connection portion is provided to a bottom of the pack cover, and
wherein the at least one cover connection portion is provided to an upper side of the module case.

7. The battery pack according to claim 1, wherein the BMS is operated to manage the plurality of battery modules entirely or to manage at least one battery module among the plurality of battery modules individually.

8. An energy storage system, comprising:
at least one battery pack as defined in claim 1.

9. The battery pack according to claim 1, wherein the support unit comprises a first connection member and a second connection member; and
a connection member pivotally connecting the first connection member to the second connection member.

10. The battery pack according to claim 1, wherein the support unit comprises a first connection member having a first guide slit and a second connection member having a second guide slit; and
a connection member extending through the first guide slit and the second guide slit to secure the first connection member to the second connection member.

* * * * *